(12) United States Patent
D'Amario

(10) Patent No.: US 8,808,825 B2
(45) Date of Patent: Aug. 19, 2014

(54) ROTATING DEVICE

(76) Inventor: Nina D'Amario, Brooklyn, NY (US)

( * ) Notice: Subject to any disclaimer, the term of this patent is extended or adjusted under 35 U.S.C. 154(b) by 0 days.

(21) Appl. No.: 13/611,293

(22) Filed: Sep. 12, 2012

(65) Prior Publication Data

US 2013/0239728 A1    Sep. 19, 2013

Related U.S. Application Data

(63) Continuation of application No. 12/971,508, filed on Dec. 17, 2010, now Pat. No. 8,361,588.

(51) Int. Cl.
*F16H 55/02* (2006.01)

(52) U.S. Cl.
CPC ..................... *F16H 55/02* (2013.01)
USPC .................. 428/66.7; 428/66.1; 428/99

(58) Field of Classification Search
CPC .................. F16H 55/02; B32B 7/08
USPC .................. 428/66.1, 66.7, 99; 446/236
See application file for complete search history.

(56) References Cited

U.S. PATENT DOCUMENTS 3,234,684 A * 2/1966 Bridges .................. 446/254

* cited by examiner

*Primary Examiner* — Alexander Thomas
(74) *Attorney, Agent, or Firm* — Jeffrey Sonnabend; SonnabendLaw

(57) ABSTRACT

The present invention comprises a rotating device which comprises two pairs of disks. Each pair has a first disk in a first plane and a second disk in a second plane rigidly joined to the first disk. The second plane is perpendicular to the first plane and the first disk in each pair are detachably attached to one another and the second disk in each pair are detachably attached to one another so that each pair connectedly rotates with respect to each other. Their respective circumferential edges are in contact with one another.

12 Claims, 5 Drawing Sheets

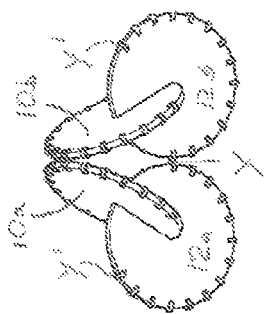
FIGURE 6-5
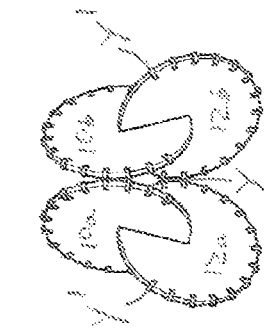
FIGURE 6-4
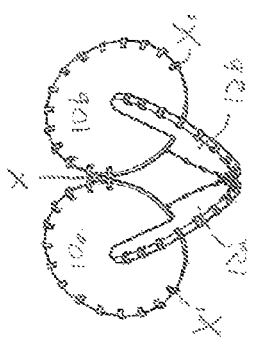
FIGURE 6-3
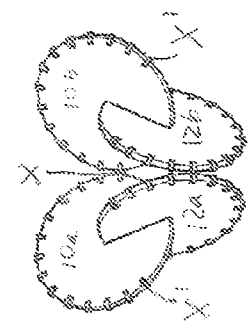
FIGURE 6-2
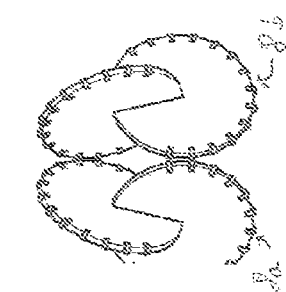
FIGURE 6-1
FIGURE 6-10
FIGURE 6-9
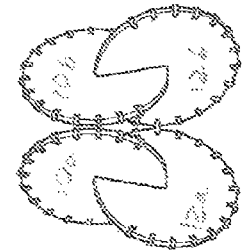
FIGURE 6-8
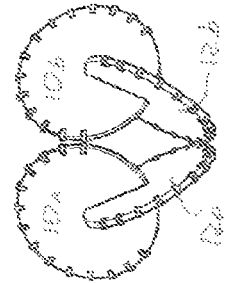
FIGURE 6-7
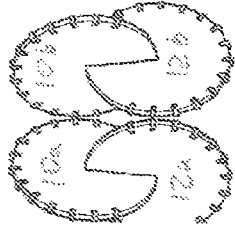
FIGURE 6-6
FIGURE 6

ROTATING DEVICE

CROSS REFERENCE TO RELATED APPLICATIONS

This application is a continuation of co-pending application 12/971,508, filed Dec. 17, 2010, now U.S. Pat. No. 8,361,588 the entirety of which is incorporated herein by reference.

BACKGROUND OF THE INVENTION

1. Field of the Invention

The present invention generally relates to a rotating device. Specifically, this invention relates to at least two pair of disks that rotate with respect to one another. This invention also relates to a pair of rotating oloids. By providing pairs of disks or at least a pair of oloids, a rotational motion can be provided with heretofore unrealized results.

2. Description of the Related Art

A pair of joined disks have been known to rotate upon a plane. Similarly, an oloid has also been known to roll upon a plane. However, two pairs of joined disks or a pair of oloids have not been known to rotate with respect to one another. Accordingly, there is now provided with this invention a new type of rotating device.

SUMMARY OF THE INVENTION

The present invention comprises a rotating device which comprises two pairs of disks. Each pair has a first disk in a first plane and a second disk in a second plane rigidly joined to the first disk. The second plane is perpendicular to the first plane and the first disk in each pair are detachably attached to one another and the second disk in each pair are detachably attached to one another at a point on their respective circumferences. Also, the second disks in each pair are detachably attached to one another at a point on their respective circumferences. Each pair of disks connectedly rotates with respect to the other.

As will be appreciated by those persons skilled in the art, a major advantage provided by the present invention is to provide a new type of rotational device. Additional objects of the present invention will become apparent from the following description.

The method and apparatus of the present invention will be better understood by reference to the following detailed discussion of specific embodiments and the attached figures which illustrate and exemplify such embodiments.

DESCRIPTION OF THE DRAWINGS

A specific embodiment of the present invention will be described with reference to the following drawings, wherein:

FIGS. 6-1 through 6-10 are a sequence of orthogonal views showing ten steps of a full cycle of the rotational movement of an embodiment of the device.

FIG. 7 is an orthogonal view of one-half of another embodiment of the present invention.

DESCRIPTION OF THE PREFERRED EMBODIMENT

The following preferred embodiment as exemplified by the drawings is illustrative of the invention and is not intended to limit the invention as encompassed by the claims of this application. A rotational apparatus is disclosed herein.

Figure 1:
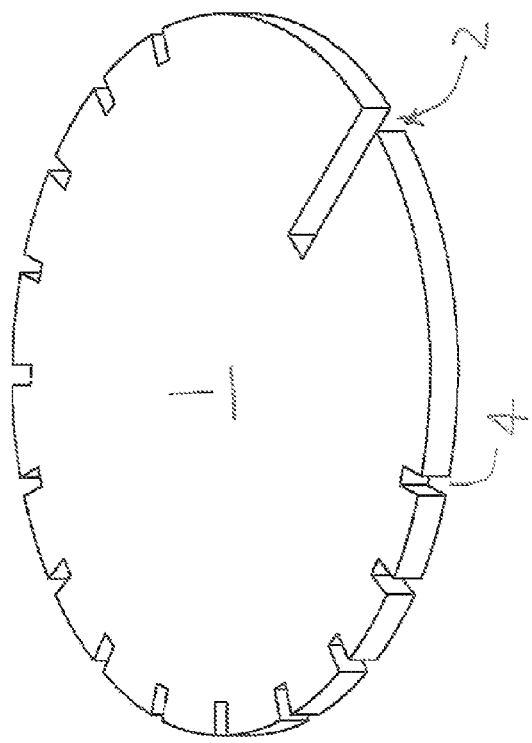
FIG. 1 is a top view of a disk of an embodiment of the present invention.
Figure 2:
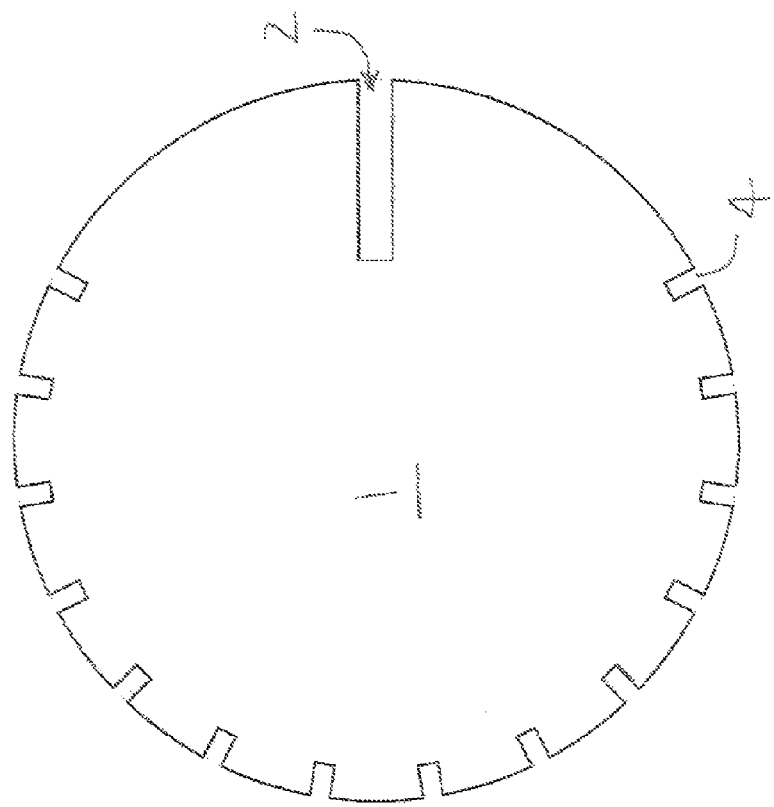
FIG. 2 is an orthogonal view of the disk of FIG. 1.

One embodiment of the rotational apparatus is made up of identical disks 1, as illustrated generally in FIGS. 1 and 2. The disks can be made of any type of relatively rigid material, for example, plastic, metal, or ceramic and may be of any diameter chosen by the user. In one embodiment, the disks may be 3.5 inches in diameter and 0.17 inches thick. The disks may be solid or hollow. They may also be opaque, translucent, or transparent and of any color desired by the user.

A main slot 2 may be provided which extends radially from the circumference toward the center of the disk. The main slot 2 may extend approximately 0.9 inches as depicted, or, alternatively may extend entirely to the center of the disk. It may also extend a distance less than that shown. The width of the main slot is preferably the thickness of the disk itself, as will become evident as the rotating device is assembled.

A series of slots 4 may be provided around the circumference of the disk 1. The series of slots may be around all or any portion of the circumference of the disk. The series of slots may be either equally spaced, for example, every 18°, or alternatively, unequally spaced. The slots may extend, for example, approximately 0.16 inches radially toward the center of the disk and may be 0.10 inches wide.

Figure 3:
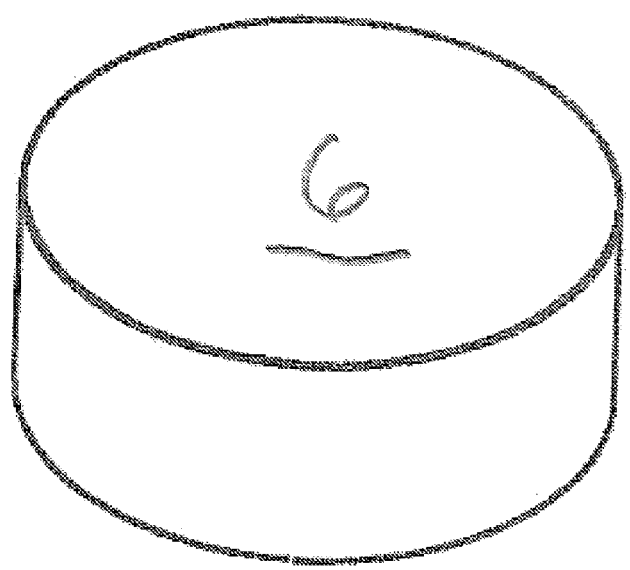
FIG. 3 is an orthogonal view of a magnet of an embodiment of the present invention.

As shown in FIG. 3, an attachment device 6 may be provided. The attachment device is to be positioned upon the circumference of the disks. The attachment device may be, for example, a magnet. Alternatively, the attachment device may be hook and loop devices, or any type of self-attractive device that is easily detachable, for example, a zipper. The attachment device is preferably a magnet that is adapted to fit into the series of slots 4 on the circumference of the disk. The magnet may be, for example, any type of magnet, either permanently magnetized or electrically magnetized. In the case of the attachment device being a permanent magnet, it is typically 0.10 inches thick so as to fit in the series of slots 4 and 0.24 inches in diameter, but may be of any size and shape suitable for its described purpose.

Figure 4:
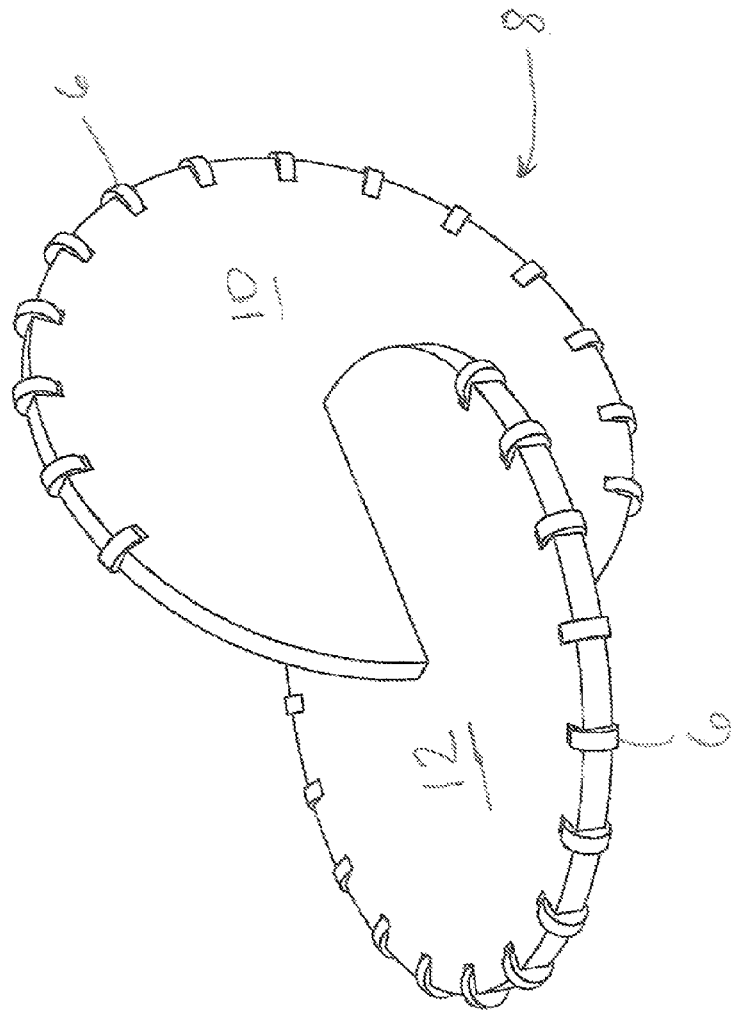
FIG. 4 is an orthogonal view of a pair of disks of an embodiment of the present invention.

As illustrated in FIG. 4, two of the disks 1 are fitted to each other by their respective main slots 2 to form a pair of disks 8. The pair of disks 8 comprise a first disk 10 and a second disk 12. The first disk 10 is in one plane and the second disk 12 is in a second plane. The plane of the first disk 10 is perpendicular to the plane of the second disk 12. Preferably, the two disks are rigidly attached to one another to form the pair of disks 8. Although the center of the first disk 10 and the center of the second disk 12 are shown at a distance less than the diameter of the disks themselves, they may be positioned either closer or further apart. For example, the distance between the center of the first disk and the center of the second disk may be the radius of the disks. Alternatively, the first disk 10 and the second disk 12 may be attached at their respective circumferences, in which case the distance between the center of the first disk and the center of the second disk may be the diameter of the disks.

The attachment devices 6 are positioned about at least a portion of the circumferences of each of the disks. The attachment devices may extend beyond the circumference of the disks, for example, the attachment devices may extend 0.8 inches. Alternatively, the attachment devices may be flush with the circumference of the disks. Although the particular placement of the magnets about the circumference of the disks may be distinctive and may additionally provide a particular aesthetic quality to each of the pair of disks, it is merely the attachment device's self-attractive and detachable quality that is all that is required.

Figure 5:
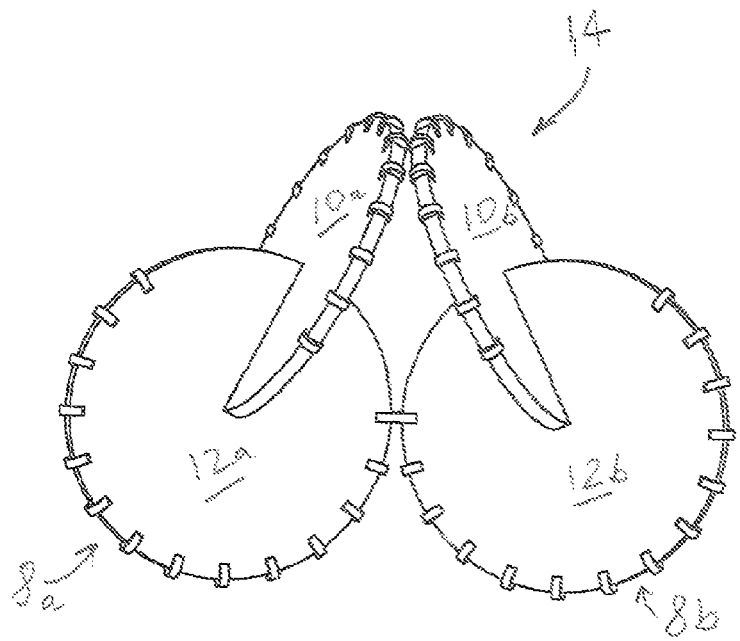
FIG. 5 is an orthogonal view of two pairs of coupled disks of an embodiment of the present invention.

FIG. 5 shows two pairs 8a and 8b, respectively, of the disks attached to each other by the attachment devices to form one embodiment of the rotating device 14. Each of the first disks 10a and 10b of each pair are attached to one another by the attachment devices on their respective circumferences. Similarly, each of the second disks 12a and 12b of each pair are attached to one another by the attachment devices on their respective circumferences. As the attachment devices are designed to be relatively easily detachable, one of the pair of disks 8a may rotate with respect to the other of the pair of disks 8b.

Ten stages of a full cycle of rotation of one embodiment of the present invention are illustrated in FIGS. 6-1 to 6-10. As one of the pair, 8a for example, rotates clockwise, the other of the attached pair, 8b for example, is made to rotate counter-clockwise. As they rotate with respect to each other, a portion of the circumferences of the first disks 10a and 10b of each pair of disks continually contact each other and a portion of the circumferences of the second disks 12a and 12b of each pair of disks continually contact each other. The contact points of the disks of each pair oscillate along an arc of the respective circumferential edges between two extreme points x and $x^1$ of the first disks of each pair, 10a and 10b respectively, and between two extreme points y and $y^1$ on the circumferences of the second disks of each pair, 12a and 12b respectively, as the pair of disks rotate with respect to each other.

In the cases where the disks are translucent, they may be made of different colors or transparencies thereby allowing light to alternately travel between one or more of the rotating disks as they rotate affording different optical effects. For example, where the disks are of two different translucent colors and the disk is lit from above the plane and rolled along the surface of the plane, the colors of the disks will mix on the plane (e.g., where a blue and red translucent disk are utilized, the colors will mix to form a purple projection on the plane).

Figure 7:
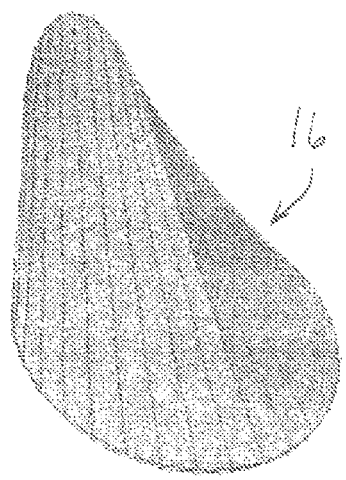

FIG. 7 depicts an alternative formation to one of the pair of disks 8. A single oloid 16 is shown. In this embodiment, the rotating device comprises a pair of oloids. The oloid may be formed as a solid or may be hollow. The oloid 16 may also be formed by forming a contour connecting the surfaces of the circumferences of a pair of disks 8. The contour may be smooth or discontinuous. The pair of oloids may be made to rotate in the same manner as depicted in FIG. 6.

In other embodiments not shown, multiple sets of disk pairs may be joined as described above for a two pair set. For example, a set of four pairs of disks may be joined and rotated relative to one another while maintaining the circumferential contact as described above.

Although the particular embodiments shown and described above will prove to be useful in many applications in the rotational arts to which the present invention pertains, further modifications of the present invention, for example, types of pumps, turbines or mixing devices, will occur to persons skilled in the art. All such modifications are deemed to be within the scope and spirit of the present invention as defined by the appended claims.

What is claimed is:

1. A rotating device, comprising a disk having attachment devices on at least a portion of its circumference and a radially extending slot for mating with another identical disk for making a first pair of disks and a second pair of disks so that a first disk of both pairs of disks is positioned in a first plane and a second disk of both pairs of disks is positioned in a second plane, wherein said first disks of each pair contact one another at a point on their respective circumferences and said second disks of each pair contact one another at a point on their respective circumferences so that each pair of disks rotate with respect to each other, wherein said attachment devices are capable of detachable attachment and are selected from the group comprising magnets, zippers, and hooks and loops.

2. The rotating device of claim 1, wherein said first and second disks of each pair are rigidly connected to each other at their circumferences.

3. The rotating device of claim 1, wherein said first and second disks of each pair are rigidly connected to each other so that their respective centers are at a distance less than their diameter from each other.

4. The rotating device of claim 1, wherein said attachment devices are equally spaced.

5. The rotating device of claim 1, wherein said attachment devices are spaced in groups.

6. The rotating device of claim 1, wherein said first and second disks of each pair have a contour connecting their circumferences to form a pair of oloids.

7. The rotating device of claim 1, wherein said first and second disks of said pair is adapted to be rigidly connected to said other pair of disks at said circumferences.

8. The rotating device of claim 1, wherein said first and second disk of said pair is adapted to be rigidly connected to said other pair of disks so that their respective centers are at a distance less than their diameter from each other.

9. The rotating device of claim 1, wherein said radially extending slot extends from the center to the circumference of the disk and wherein said first and second disks of said pair have attachment devices on said circumferences for said detachable attachment.

10. The rotating device of claim 9, wherein said attachment devices are equally spaced.

11. The rotating device of claim 9, wherein said attachment devices are spaced in groups.

12. The rotating device of claim 9, wherein said attachment devices are magnets.

* * * * *